United States Patent
Feinman et al.

(10) Patent No.: US 10,133,865 B1
(45) Date of Patent: Nov. 20, 2018

(54) SYSTEMS AND METHODS FOR DETECTING MALWARE

(71) Applicant: Symantec Corporation, Mountain View, CA (US)

(72) Inventors: Reuben Feinman, Mountain View, CA (US); Jugal Parikh, Mountain View, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 223 days.

(21) Appl. No.: 15/379,520

(22) Filed: Dec. 15, 2016

(51) Int. Cl.
*G06F 21/56* (2013.01)
*G06N 3/08* (2006.01)
*G06N 3/04* (2006.01)

(52) U.S. Cl.
CPC ............. *G06F 21/56* (2013.01); *G06N 3/04* (2013.01); *G06N 3/08* (2013.01); *G06F 2221/034* (2013.01)

(58) Field of Classification Search
CPC ............................ G06F 21/56; G06F 2221/034
USPC .......................................................... 726/22
See application file for complete search history.

(56) References Cited

U.S. PATENT DOCUMENTS

| | | | | |
|---|---|---|---|---|
| 8,644,342 B2 * | 2/2014 | Stolfo | ............ | G06F 21/552 370/474 |
| 9,003,528 B2 * | 4/2015 | Stolfo | ............ | G06F 21/552 726/23 |
| 2009/0013405 A1 * | 1/2009 | Schipka | ............ | G06F 21/562 726/22 |
| 2013/0042294 A1 * | 2/2013 | Colvin | ............ | G06F 21/53 726/1 |
| 2013/0174255 A1 * | 7/2013 | Stolfo | ............ | G06F 21/552 726/22 |
| 2014/0196147 A1 * | 7/2014 | Stolfo | ............ | G06F 21/552 726/23 |
| 2015/0180895 A1 * | 6/2015 | Stolfo | ............ | G06F 21/552 726/22 |

OTHER PUBLICATIONS

Bilar; Statistical Structure: Fingerprinting Malware for Classification and Analysis; on or before Jan. 26, 2006.
Davis; Deep Learning on Disassembly Data; on or before Aug. 6, 2015.

* cited by examiner

*Primary Examiner* — Teshome Hailu
(74) *Attorney, Agent, or Firm* — Fisher Broyles, LLP (57) ABSTRACT

The disclosed computer-implemented method for detecting malware may include (1) identifying a plurality of programs represented in machine code, (2) deriving a plurality of opcode n-grams from opcode sequences within the plurality of programs, (3) training an autoencoder by using the plurality of opcode n-grams as input, (4) discovering a set of features within the autoencoder after training the autoencoder, each feature within the set of features comprising a linear combination of opcode n-grams from the plurality of opcode n-grams, and (5) classifying a potentially malicious program as malicious by using the set of features discovered within the autoencoder to analyze the potentially malicious program. Various other methods, systems, and computer-readable media are also disclosed.

17 Claims, 7 Drawing Sheets

SYSTEMS AND METHODS FOR DETECTING MALWARE

BACKGROUND

Consumers and businesses face a growing tide of malicious software that threatens the stability and performance of their computers and the security of their data. Computer programmers with malicious motivations have created and continue to create viruses, Trojan horses, worms, and other programs (collectively known as "malware") in an attempt to compromise computer systems. In an attempt to evade detection, malicious programmers may inject malware into or among legitimate programs.

Many security software companies attempt to combat malware by creating and deploying malware signatures to their customers on a regular basis. However, a significant amount of malware has not yet been identified and, therefore, may not be represented in traditional malware signature databases, particularly since malware authors may regularly modify their malware in an attempt to circumvent commonly employed signature-based malware-detection mechanisms. As malware variants proliferate, security software companies may struggle to keep up in the race to identify, analyze, and create signatures for detecting new variants.

The instant disclosure, therefore, identifies and addresses a need for systems and methods for detecting malware.

SUMMARY

As will be described in greater detail below, the instant disclosure describes various systems and methods for detecting malware.

In one example, a computer-implemented method for detecting malware may include (i) identifying a group of programs represented in machine code, (ii) deriving a group of opcode n-grams from opcode sequences within the programs, (iii) training an autoencoder by using the opcode n-grams as input, (iv) discovering a set of features within the autoencoder after training the autoencoder, each feature within the set of features including a linear combination of opcode n-grams from the opcode n-grams, and (v) classifying a potentially malicious program as malicious by using the set of features discovered within the autoencoder to analyze the potentially malicious program.

In some examples, the computer-implemented method may further include performing a security action on the potentially malicious program based on classifying the potentially malicious program as malicious.

In some examples, using the set of features discovered within the autoencoder to analyze the potentially malicious program may include (i) initializing a neural network with the set of features discovered within the autoencoder, (ii) training the neural network with supervision using a training set labeled to indicate whether each sample within the training set is malicious, and (iii) classifying the potentially malicious program using the trained neural network.

In some examples, using the set of features discovered within the autoencoder to analyze the potentially malicious program may include extracting the set of features discovered within the autoencoder from the potentially malicious program and providing the extracted set of features as input to a machine learning classifier previously trained according to the set of features discovered within the autoencoder.

In one embodiment, the opcode n-grams may include machine code opcodes and not mnemonic-based instructions. In one embodiment, the opcode n-grams may include opcodes without accompanying operands.

In one embodiment, deriving the opcode n-grams from the programs includes excluding a subset of opcodes from the opcode n-grams. In some examples, deriving the opcode n-grams from the programs may include extracting a group of opcodes from a program within the programs without mapping the opcode to a mnemonic instruction.

In one embodiment, a system for implementing the above-described method may include (i) an identification module, stored in memory, that identifies a group of programs represented in machine code, (ii) a derivation module, stored in memory, that derives a group of opcode n-grams from opcode sequences within the programs, (iii) a training module, stored in memory, that trains an autoencoder by using the opcode n-grams as input, (iv) a discovery module, stored in memory, that discovers a set of features within the autoencoder after training the autoencoder, each feature within the set of features including a linear combination of opcode n-grams from the opcode n-grams, (v) a classification module, stored in memory, that classifies a potentially malicious program as malicious by using the set of features discovered within the autoencoder to analyze the potentially malicious program, and (vi) at least one physical processor configured to execute the identification module, the derivation module, the training module, the discovery module, and the classification module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a group of programs represented in machine code, (ii) derive a group of opcode n-grams from opcode sequences within the programs, (iii) train an autoencoder by using the opcode n-grams as input, (iv) discover a set of features within the autoencoder after training the autoencoder, each feature within the set of features including a linear combination of opcode n-grams from the opcode n-grams, and (v) classify a potentially malicious program as malicious by using the set of features discovered within the autoencoder to analyze the potentially malicious program.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting malware. As will be explained in greater detail below, by employing an autoencoder to discover features from programs (in terms of linear combinations of opcode n-grams), the systems and methods described herein may generate and use effective machine learning models based on the discovered features. By producing features based on opcode n-grams (rather than, e.g., mnemonics that represent instructions in an abstracted form), the systems and methods described herein may avoid overgeneralizing instructions with shared mnemonic representations but with different properties and/or identifying characteristics. In addition, by examining opcode n-grams of potentially malicious programs, the systems and methods described herein may capture characteristics distinguishing malicious and benign programs that may not be represented in signature-based approaches that rely on high-level information such as characteristics of Portable Executable headers or control flow graphs. Furthermore, by examining opcode n-grams rather than high-level abstractions generated from analyzing programs, the systems and methods described herein may more efficiently analyze programs (e.g., by avoiding potentially computationally expensive procedures for converting programs to high-level representations).

In addition, the systems and methods described herein may improve the functioning of a computing device by improving the malware classification capabilities of the device. Furthermore, these systems and methods may improve the functioning of a computing device by improving the security of the device (e.g., by reducing false negatives and, therefore, more consistently remediating malware). In addition, these systems and methods may improve the functioning of a computing device by reducing false positives produced by security systems and thereby (i) reducing the interference of security systems with legitimate programs, files, and operations and (ii) reducing the computational burden that would be placed on computing resources when taking unnecessary remediation actions (and, therefore, improving the capability of the computing device to execute primary applications with to high performance standards). Furthermore, these systems and methods may improve the functioning of a computing device by improving the performance of processes that analyze files (e.g., each file that is created on and/or transferred to the computing device in the case of an endpoint device, or each file analyzed by a central security system in the case of a security server) by employing opcode-based analysis rather than generating computationally costly abstractions.

Figure 1:
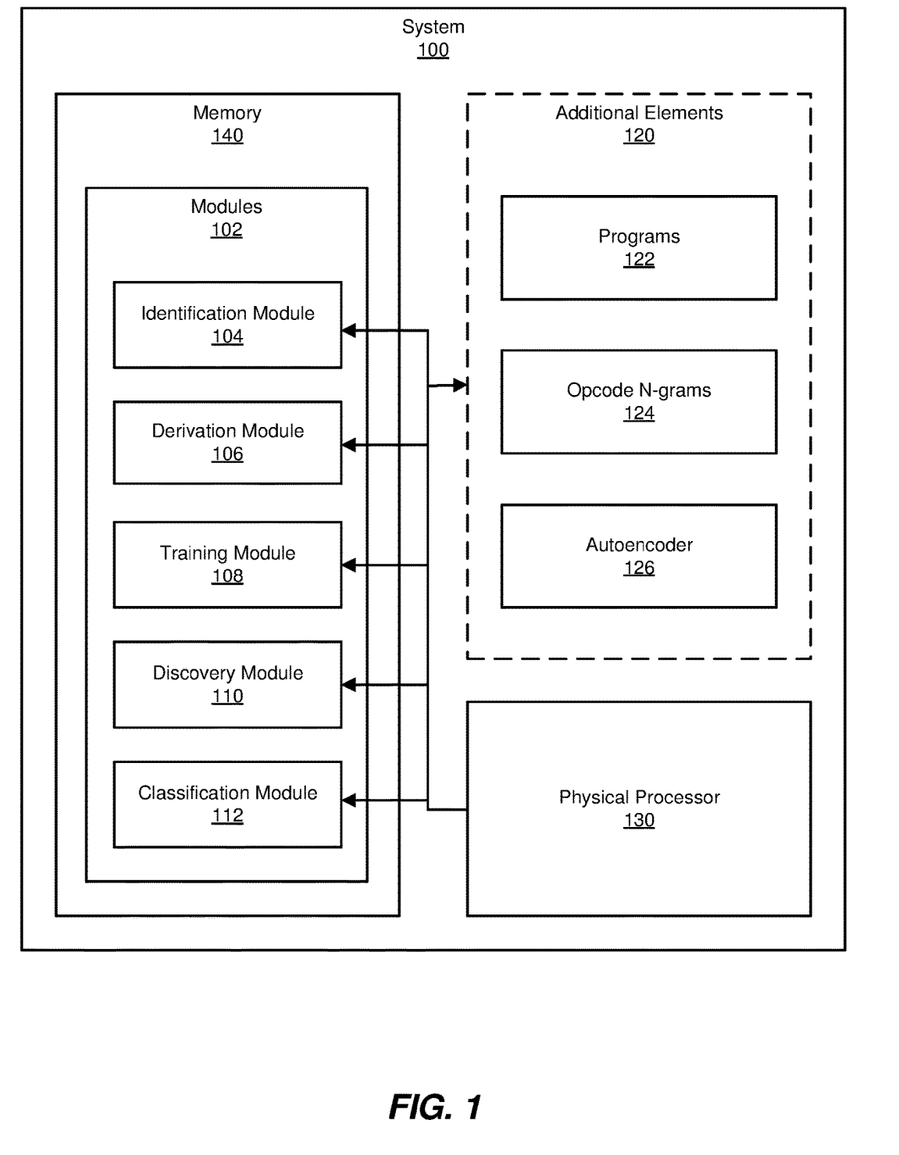
FIG. 1 is a block diagram of an example system for detecting malware.
Figure 2:
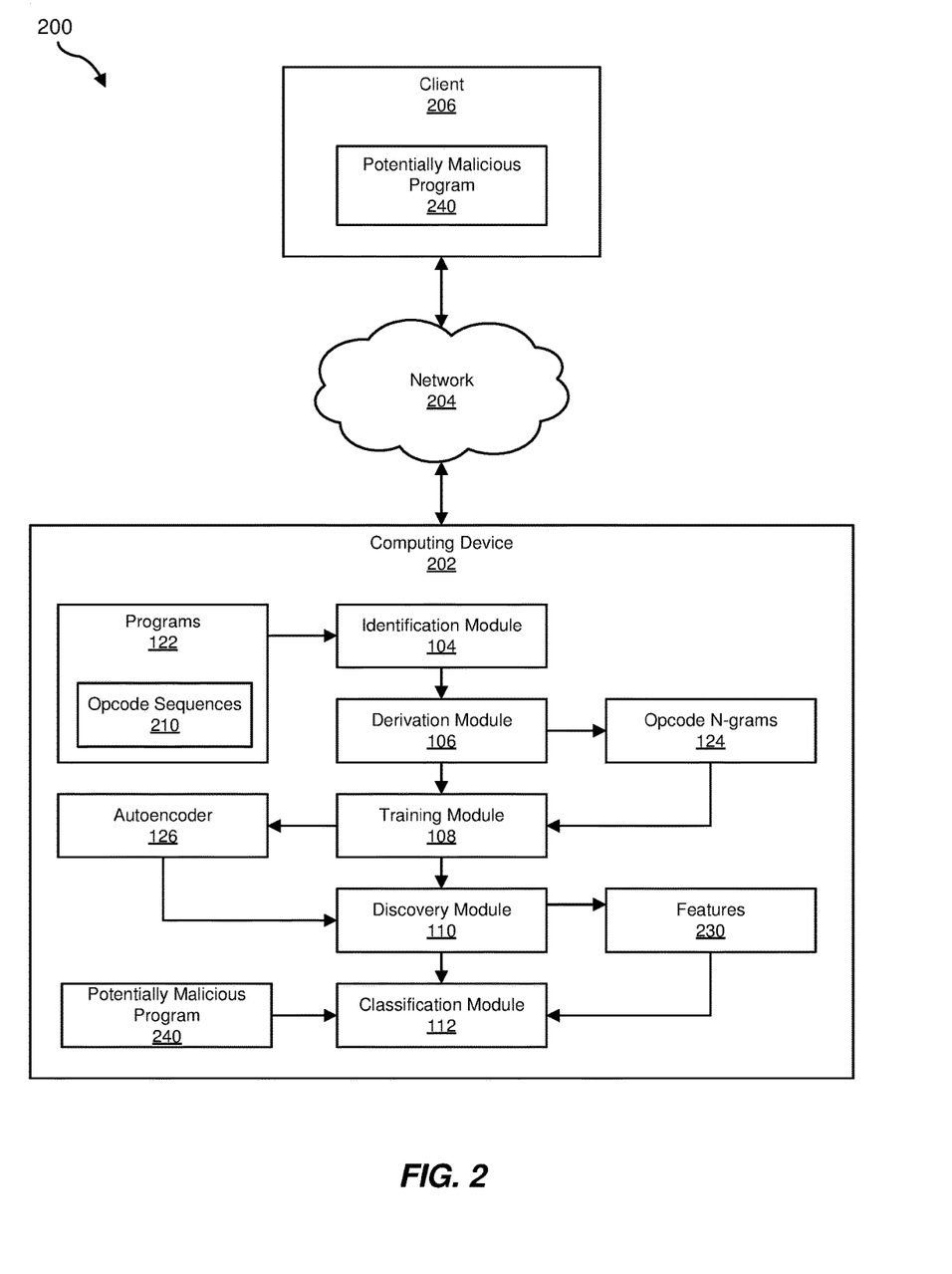
FIG. 2 is a block diagram of an additional example system for detecting malware.
Figure 4:
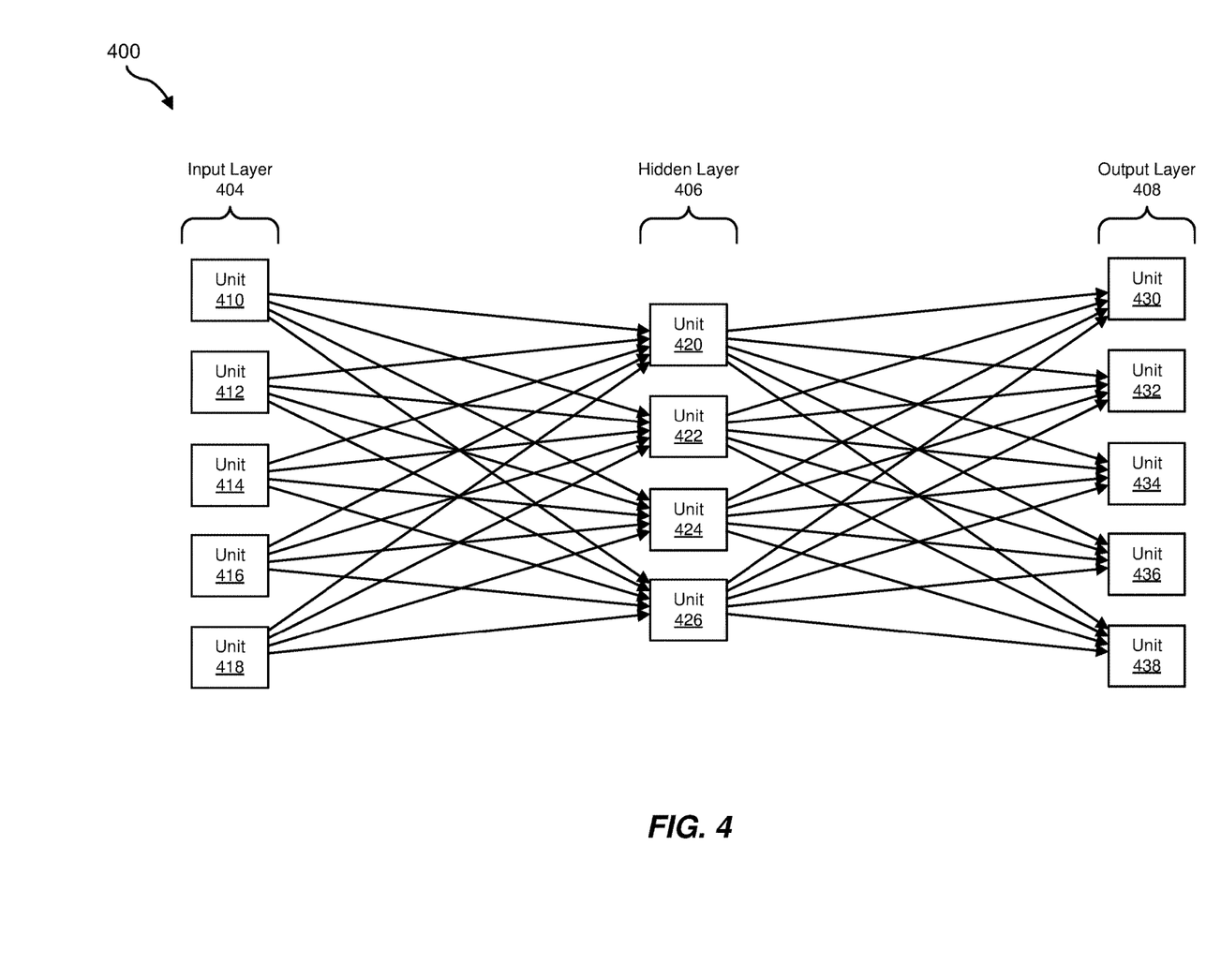
FIG. 4 is a block diagram of an example autoencoder for enabling malware detection.
Figure 5:
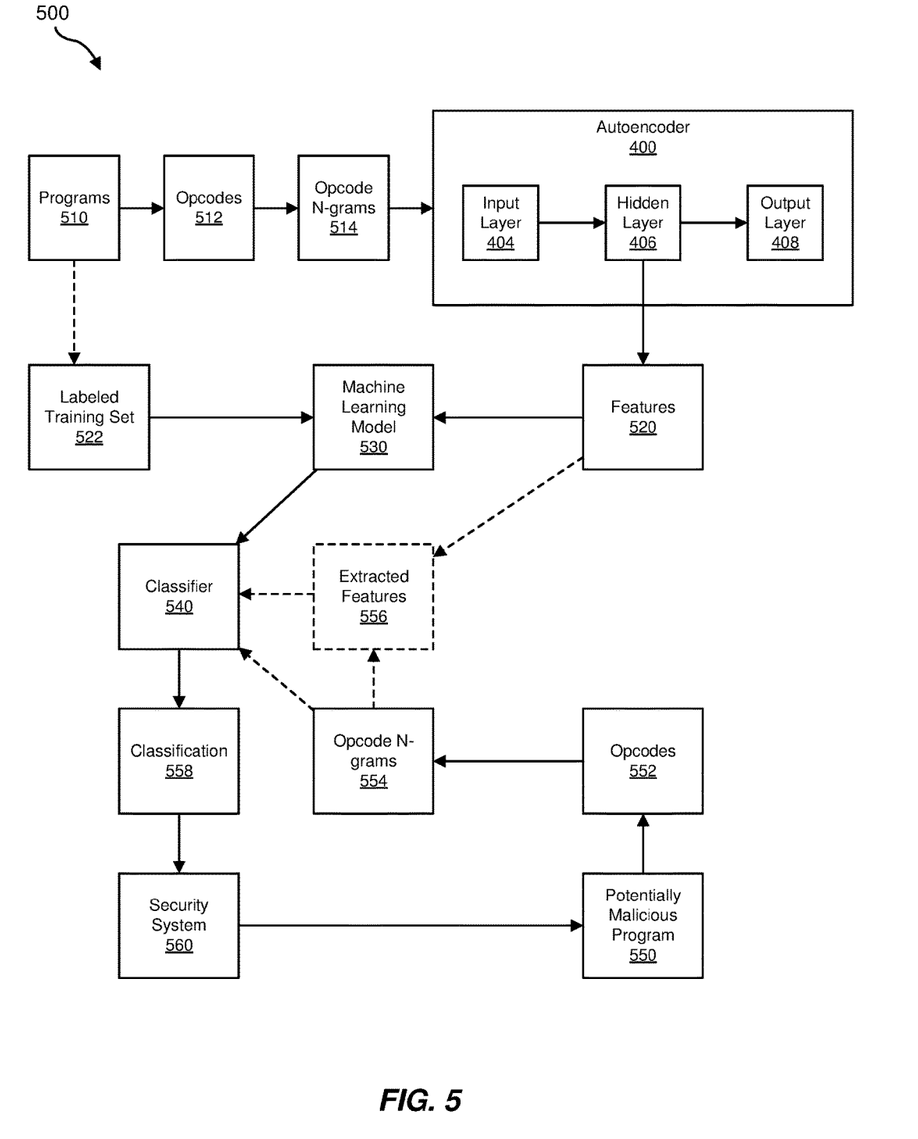
FIG. 5 is a block diagram of an example computing system for detecting malware.

The following will provide, with reference to FIGS. 1, 2, and 5, detailed descriptions of example systems for detecting malware. Detailed descriptions of corresponding computer-implemented methods will also be provided in connection with FIG. 3. Detailed descriptions of an example autoencoder for enabling malware detection will be provided in connection with FIG. 4. In addition, detailed descriptions of an example computing system and network architecture capable of implementing one or more of the embodiments described herein will be provided in connection with FIGS. 6 and 7, respectively.

FIG. 1 is a block diagram of example system 100 for detecting malware. As illustrated in this figure, example system 100 may include one or more modules 102 for performing one or more tasks. For example, and as will be explained in greater detail below, example system 100 may include an identification module 104 that identifies a plurality of programs represented in machine code. Example system 100 may additionally include a derivation module 106 that derives a plurality of opcode n-grams from opcode sequences within the plurality of programs. Example system 100 may also include a training module 108 that trains an autoencoder by using the plurality of opcode n-grams as input. Example system 100 may additionally include a discovery module 110 that discovers a set of features within the autoencoder after training the autoencoder, each feature within the set of features that includes a linear combination of opcode n-grams from the plurality of opcode n-grams. Example system 100 may also include a classification module 112 that classifies a potentially malicious program as malicious by using the set of features discovered within the autoencoder to analyze the potentially malicious program. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or client 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting malware. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more additional elements 120, such as programs 122, opcode n-grams 124, and an autoencoder 126. Programs 122 generally represent any type or form of program in machine code form (e.g., executable files, processes, etc.). Opcode n-grams 124 generally represent any sequences of opcodes that may be observed within programs. Autoencoder 126 generally represents any type or form of machine learning model that may produce features from training data via unsupervised learning techniques.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a client 206 via a network 204. In one example, all or a portion of the functionality of modules 102 may be performed by computing device 202, client 206, and/or any other suitable computing system. As will be described in greater detail below, one or more of modules 102 from FIG. 1 may, when executed by at least one processor of computing device 202 and/or client 206, enable computing device 202 and/or client 206 to detect malware and/or to generate malware detection methods. For example, and as will be described in greater detail below, one or more of modules 102 may cause computing device 202 to correctly classify a potentially malicious program 240 observed on client 206. For example, and as will be described in greater detail below, identification module 104 may identify programs 122 represented in machine code. Derivation module 106 may derive opcode n-grams 124 from opcode sequences 210 within programs 122. Training module 108 may train autoencoder 126 by using opcode n-grams 124 as input. Discovery module 110 may discover features 230 within autoencoder 126 after training autoencoder 126, each feature within features 230 including a linear combination of opcode n-grams from opcode n-grams 124. Classification module 112 may classify potentially malicious program 240 as malicious by using features 230 discovered within autoencoder 126 to analyze potentially malicious program 240.

Computing device 202 generally represents any type or form of computing device capable of reading computer-executable instructions. In one example, computing device may represent a security server that provides malware classification (e.g., for endpoint devices). Additional examples of computing device 202 include, without limitation, security servers, application servers, web servers, storage servers, and/or database servers configured to run certain software applications and/or provide various security, web, storage, and/or database services. Although illustrated as a single entity in FIG. 2, computing device 202 may include and/or represent a plurality of servers that work and/or operate in conjunction with one another.

Client 206 generally represents any type or form of computing device that is capable of executing computer-readable instructions. For example, client 206 may represent an endpoint device (e.g., with a security system that analyzes executable files for potential malware and/or that requests analyses of executable files for potential malware). Additional examples of client 206 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device.

Network 204 generally represents any medium or architecture capable of facilitating communication or data transfer. In one example, network 204 may facilitate communication between computing device 202 and client 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 3:
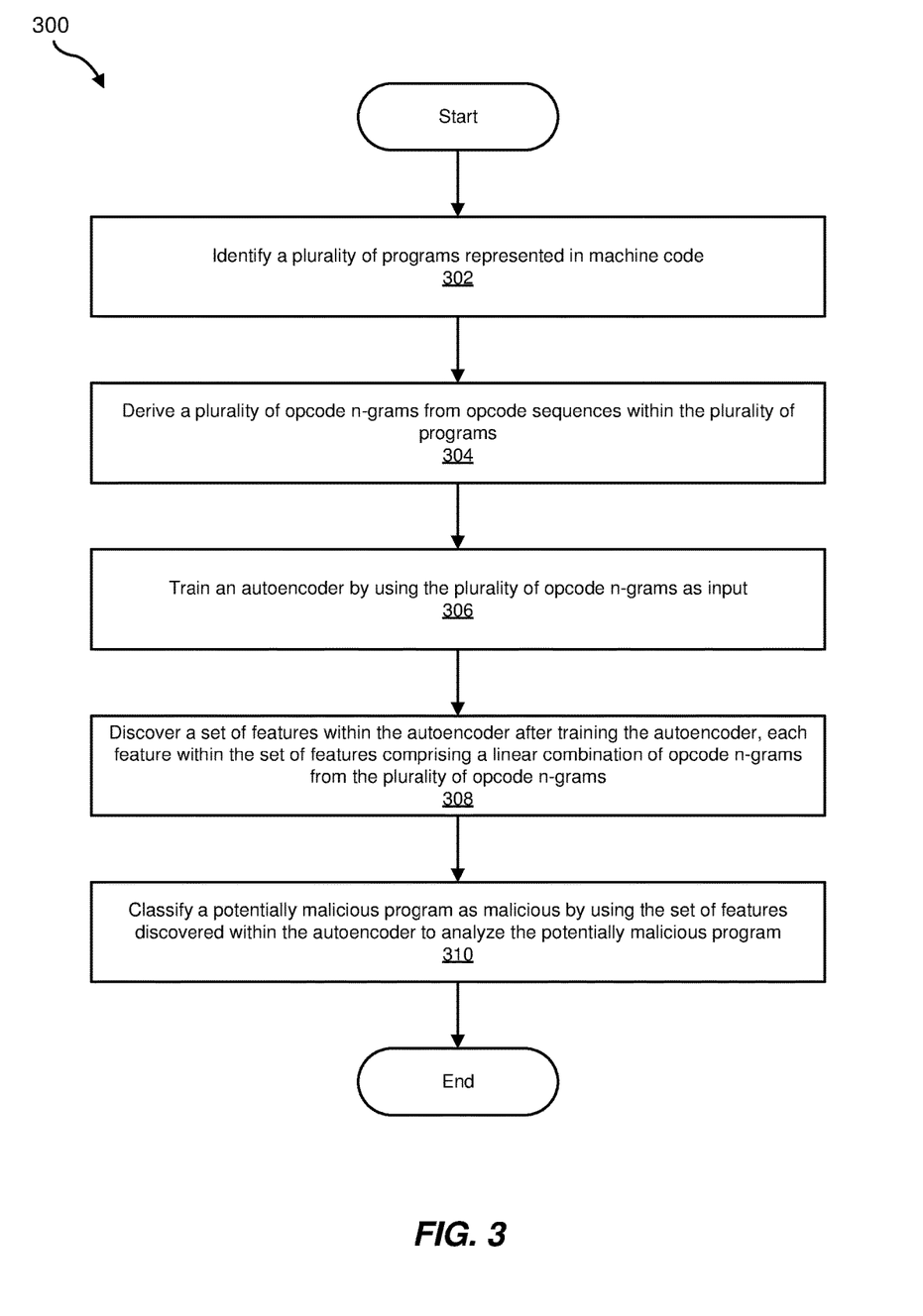
FIG. 3 is a flow diagram of an example method for detecting malware.

FIG. 3 is a flow diagram of an example computer-implemented method 300 for detecting malware. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a plurality of programs represented in machine code. For example, identification module 104 may, as part of computing device 202 in FIG. 2, identify programs 122 represented in machine code.

The term "program," as used herein, generally refers to any executable file, machine-code object file, library, process, and/or application that may include machine code and/or a representation of machine code.

The term "machine code," as used herein, generally refers to computer instructions directly executable by a processor. Accordingly, machine code may stand in contrast to higher-level and/or more abstract representations of programs (e.g., assembly code) that may require compilation, assembling, and/or interpretation for execution.

Identification module 104 may identify the plurality of programs in any of a variety of contexts. For example, identification module 104 may identify a database of programs. In some examples, identification module 104 and/or one or more associated systems may gather the plurality of programs (e.g., over a period of time). For example, identification module 104 may operate as a part of a security server that receives programs from endpoint security systems installed on endpoint systems. Additionally or alternatively, identification module 104 may operate as a part of an internet crawler that retrieves programs. In some examples, the plurality of programs may include labeled programs (e.g., programs classified as malicious or benign). Additionally or alternatively, the plurality of programs may include unlabeled programs (e.g., programs not classified as malicious or benign).

FIG. 5 illustrates an example system 500 for detecting malware. Using FIG. 5 as an example of step 302, identification module 104 may identify programs 510.

Returning to FIG. 3, at step 304, one or more of the systems described herein may derive a plurality of opcode n-grams from opcode sequences within the plurality of programs. For example, derivation module 106 may, as part of computing device 202 in FIG. 2, derive opcode n-grams 124 from opcode sequences 210 within programs 122.

The term "opcode," as used herein, generally refers to any instruction in machine code. Accordingly, the term "opcode" may refer to a machine language instruction (rather than, e.g., a mnemonic instruction, such as an assembly language instruction). In some examples, opcodes in programs may be accompanied by operands (e.g., parameters to the opcodes). However, in some examples, the systems described herein may examine, extract, and/or otherwise make use of opcodes observed within programs while ignoring and/or discarding any accompanying operands.

The term "n-gram," as used herein, generally refers to any sequence of data units within a sequence of data units. Thus, for example, the term "opcode n-gram" may refer to a sequence of opcodes (e.g., as ordered within a program). The n-grams may include any suitable sequence length. For example, opcode n-grams may include 2-grams (e.g., sequences of two opcodes), 3-grams (e.g., sequences of three opcodes), 4-grams (e.g., sequences of four opcodes), etc.

Derivation module 106 may derive the opcode n-grams from opcode sequences within the plurality of programs in any suitable manner. For example, derivation module 106 may, for each program, sequentially extract opcodes found within the program and generate opcode n-grams from the extracted sequences of opcodes. In some examples, the opcode n-grams may overlap (e.g., n-grams may share elements). For example, derivation module 106 may generate five opcode 3-grams from a program with seven opcodes: (i) an n-gram with the first, second, and third opcodes (according to their order of appearance in the program), (ii) an n-gram with the second, third, and fourth opcodes, (iii) an n-gram with the third, fourth, and fifth opcodes, (iv) an n-gram with the fourth, fifth, and sixth opcodes, and (v) an n-gram with the fifth, sixth, and seventh opcodes.

In some examples, the systems described herein may exclude some opcodes from consideration. For example, derivation module 106 may, when deriving the plurality of opcode n-grams from the plurality of programs, exclude a subset of opcodes from the plurality of opcode n-grams. Thus, for example, derivation module 106 may ignore the excluded opcodes when generating opcode n-grams. In some examples, derivation module 106 may exclude n-grams that would include the excluded opcodes. In some examples, derivation module 106 may skip excluded opcodes when generating n-grams. For example, a program may include seven opcodes, but derivation module 106 may identify the third opcode as an excluded opcode. Accordingly, derivation module 106 may generate four opcode 3-grams from the program: (i) an n-gram with the first, second, and fourth opcodes, (ii) an n-gram with the second, fourth, and fifth opcodes, (iii) an n-gram with the fourth, fifth, and sixth opcodes, and (iv) an n-gram with the fifth, sixth, and seventh opcodes. In some examples, derivation module 106 may exclude branching instructions from opcode n-grams.

In some examples, derivation module 106 may represent opcodes within the opcode n-grams through the use of tokens (rather than, e.g., the values of the machine code instructions). In these examples, derivation module 106 may use tokens with a one-to-one correspondence to the opcodes (e.g., such that the mapping is exact in both directions with no information loss). Accordingly, the tokens used by derivation module 106 may be isomorphic to the opcodes represented by the tokens.

In some examples, the plurality of opcode n-grams may include machine code opcodes and not mnemonic-based instructions. In this manner, the systems described herein may preserve the precise opcode information instead of losing the information in a mapping between opcodes and mnemonic-based instructions that is not one-to-one.

In some examples, the plurality of opcode n-grams may include opcodes without accompanying operands. In this manner, the systems described herein may more effectively detect malware with minor mutations and/or may produce features that better reflect the functionality of programs.

In some examples, derivation module 106 may derive the plurality of opcode n-grams from the plurality of programs by extracting a plurality of opcodes from a program within the plurality of programs without mapping the opcode to a mnemonic instruction. For example, derivation module 106 may read opcodes from a binary executable file directly instead of disassembling the binary executable file into mnemonic-based instructions (e.g., an assembly language). In this manner, derivation module 106 may process programs quickly and efficiently while avoiding information loss that may accompany translating machine code to a higher-level language.

In some examples, one or more programs may be packed (e.g., encrypted and/or otherwise obfuscated). Accordingly, derivation module 106 may unpack the program before extracting opcode n-grams from the programs.

Using FIG. 5 as an example of step 304, derivation module 106 may extract opcodes 512 (e.g., in sequences) from programs 510 and then generate opcode n-grams 514 from opcodes 512.

Returning to FIG. 3, at step 306, one or more of the systems described herein may train an autoencoder by using the plurality of opcode n-grams as input. For example, training module 108 may, as part of computing device 202 in FIG. 2, train autoencoder 126 by using opcode n-grams 124 as input.

The term "autoencoder," as used herein, generally refers to any type or form of machine learning model that may produce features from training data via unsupervised deep learning techniques. For example, the term "autoencoder" may refer to a neural network with a hidden layer. Training module 108 may use one or more machine learning techniques, such as backpropagation, to train the autoencoder to produce values in the output layer of the autoencoder that match the values provided in the input layer of the autoencoder. As a result of the training, the hidden layer of the autoencoder may develop features (e.g., based on linear combinations of opcode n-grams) that are highly representative of the programs in the training set (and, therefore, potentially representative of programs not within the training set).

The term "feature," as used herein, generally refers to any property of data that may be used to analyze and/or classify one or more instances of data. In some examples provided herein, the features developed within the autoencoder and used to analyze potential malware may include linear combinations of opcode n-grams. As will be explained in greater detail below, in the context of an autoencoder, systems described herein may identify a feature by identifying the weights assigned at a hidden layer unit to inputs representing opcode n-grams.

The term "linear combination," as used herein, generally refers to a weighted sum of terms. In some examples provided herein, linear combinations of opcode n-grams may include a summation of terms, where each term includes a value representing the presence of an opcode n-gram multiplied by a weight for the term (where, e.g., training module 108 may set the weight during training of the autoencoder).

Training module 108 may train the autoencoder in any suitable manner. For example, training module 108 may train the autoencoder over a fixed number of epochs. In each iteration, training module 108 may provide values representing the presence of opcode n-grams to corresponding units of an input layer of the autoencoder. Training module 108 may then use one or more error reduction techniques (e.g., backpropagation) to update the weights of connections between layers.

FIG. 4 illustrates an example autoencoder 400. As shown in FIG. 4, autoencoder 400 may include an input layer 404 with units 410, 412, 414, 416, and 418; a hidden layer 406 with units 420, 422, 424, and 426; and an output layer 408 with units 430, 432, 434, 436, and 438. In one example, training module 108 may train autoencoder 400 using one or more deep learning techniques. For example, training module 108 may train autoencoder 400 to produce values in output layer 408 that closely approximate the values provided in input layer 404. In some examples, training module 108 may provide values representing the presence of opcode n-grams to input layer 404 (e.g., each unit in input layer 404 representing a potential opcode n-gram). By modifying the weights of connections between input layer 404 and hidden layer 406 during training, training module 108 may calibrate the units of hidden layer 406 to reveal representative program features.

Using FIG. 5 as an example of step 306, training module 108 may train autoencoder 400 by using opcode n-grams 514 as input. For example, training module 108 may provide opcode n-grams 514 as input to an input layer 404 of autoencoder 400. Training module 108 may train autoencoder 400 (e.g., by using error reduction techniques in response to outputs at output layer 408), thereby altering characteristics of hidden layer 406.

Returning to FIG. 3, at step 308, one or more of the systems described herein may discover a set of features within the autoencoder after training the autoencoder, each feature within the set of features including a linear combination of opcode n-grams from the plurality of opcode n-grams. For example, discovery module 110 may, as part of computing device 202 in FIG. 2, discover features 230 within autoencoder 126 after training autoencoder 126, each feature within features 230 including a linear combination of opcode n-grams from opcode n-grams 124.

Discovery module 110 may discover the set of features within the autoencoder in any suitable manner. For example, discovery module 110 may extract formulas used within the autoencoder to produce latent variables. In some examples, discovery module 110 may inspect the attributes of a hidden layer within the autoencoder and construct the features from the attributes. For example, discovery module 110 may identify, for each unit within the hidden layer, a formula used to calculate the value for the unit and extract the formula as a feature. In some examples, the formula may include a linear combination of inputs to the hidden layer unit (e.g., each input to the hidden layer unit weighted, and all the weighted inputs added together).

Using FIG. 4 as an example of step 308, discovery module 110 may derive four features from autoencoder 400, one for each unit within hidden layer 406. For example, discovery module 110 may discover a feature corresponding to unit 420, which feature may be calculated as the summation of five terms, each term corresponding one of the five units in input layer 404 and being expressed as a value representing the presence of an opcode n-gram associated with the corresponding unit in input layer 404 multiplied by a weight assigned to the connection between that unit and unit 420.

Using FIG. 5 as an example of step 308, discovery module 110 may discover features 520 from autoencoder 400 (e.g., based on characteristics of hidden layer 406 after training autoencoder 400).

Returning to FIG. 3, at step 310, one or more of the systems described herein may classify a potentially malicious program as malicious by using the set of features discovered within the autoencoder to analyze the potentially malicious program. For example, classification module 112 may, as part of computing device 202 in FIG. 2, classify potentially malicious program 240 as malicious by using features 230 discovered within autoencoder 126 to analyze potentially malicious program 240.

Classification module 112 may use the set of features discovered within the autoencoder to analyze the potentially malicious program in any suitable manner. In some examples, classification module 112 may use the set of features discovered within the autoencoder to analyze the potentially malicious program by (i) initializing a neural network with the set of features discovered within the autoencoder, (ii) training the neural network with supervision using a training set labeled to indicate whether each sample within the training set is malicious, and (iii) classifying the potentially malicious program using the trained neural network. For example, classification module 112 may initialize the neural network with connection weights that reproduce in the neural network the features discovered within the autoencoder. The training set may be labeled according to any of a variety of schemes. For example, each sample within the training set may be labeled as malicious or benign. In some examples, the training set labels may include more detailed classifications (e.g., specifying malware families, vulnerabilities exploited, and/or malicious behaviors exhibited). Classification module 112 may use the labelling of the training set to implement supervised learning when training the neural network (e.g., training the neural network to reproduce the labelling of the training set).

In some examples, classification module 112 may use the set of features discovered within the autoencoder to analyze the potentially malicious program by extracting the set of features discovered within the autoencoder from the potentially malicious program and providing the extracted set of features as input to a machine learning classifier previously trained according to the set of features discovered within the autoencoder. For example, classification module 112 may identify a machine learning classifier trained using the set of features as inputs and/or may train a machine learning classifier using the set of features as inputs. Classification module 112 may then normalize any program to be classified in terms of the discovered set of features. Classification module 112 may then provide the features of the program as input to the machine learning classifier.

Classification module 112 may classify the potentially malicious program in any of a variety of contexts. For example, classification module 112 may operate as a part of a security server and receive a request from an endpoint security system to classify the potentially malicious program. In this example, classification module 112 may request and/or receive the program, information identifying the program, an opcode sequence of the program, a set of opcode n-grams within the program, and/or features based on opcode n-grams within the program from the endpoint security system. Classification module 112 may then transform the data describing the program into an input format consumable by the machine learning classifier (e.g., into values indicating the presence of opcode n-grams and/or linear combinations of such values) received from the endpoint security system, provide the transformed data as input to the machine learning classifier, and classify the program based on the output of the machine learning classifier. In this example, classification module 112 may then respond to the endpoint security system regarding the classification. In some examples, classification module 112 may operate as a part of an endpoint security system (e.g., that has received the machine learning classifier and/or parameters for the machine learning classifier from a security server).

In some examples, the potentially malicious program may be packed (e.g., encrypted and/or otherwise obfuscated). Accordingly, classification module 112 may unpack the potentially malicious program before extracting opcode n-grams from the potentially malicious program.

In some examples, one or more of the systems described herein may perform a security action on the potentially malicious program based on classifying the potentially malicious program as malicious. The security action may include any of a variety of actions. For example, the security action may include deleting the potentially malicious program, halting and/or blocking the execution of the potentially malicious program, quarantining and/or sandboxing the potentially malicious program, alerting a user, an administrator, and/or a security vendor of the potentially malicious program, removing permissions from the potentially malicious program, blocking behaviors of the potentially malicious program, and/or performing additional security scans and/or analyses of the potentially malicious program.

Using FIG. 5 as an example of step 310, classification module 112 may use features 520 discovered within autoencoder 400 to analyze a potentially malicious program 550. For example, classification module 112 may use features 520 to initialize a machine learning module 530 (e.g., a neural network). Classification module 112 may then train machine learning model 530 with a labeled training set 522 to produce a classifier 540. In some examples, labeled training set 522 may include one or more of programs 510. Classification module 112 may extract opcodes 552 from potentially malicious program 550 and may generate opcode n-grams 554 from opcodes 552. Classification module 112 may then provide opcode n-grams 554 as input to classifier 540 to produce a classification 558 of potentially malicious program 550. A security system 560 may then perform a security action with respect to potentially malicious program 550 in response to classification 558 of potentially malicious program 550. In some examples, machine learning module 530 may have been trained to use linear combinations of opcode n-grams instead of opcode n-grams as input. In these examples, instead of providing opcode n-grams 554 to classifier 540 as input, classification module 112 may translate opcode n-grams 554 into extracted features 556 (e.g., in line with features 520). In these examples, classification module 112 may provide extracted features 556 as input to classifier 540 instead of opcode n-grams 554.

As explained above with respect to FIG. 3, systems described herein may apply an unsupervised deep learning process (e.g., an autoencoder) to learn high-level features of programs using opcode n-grams as raw data inputs. The features that are learned by the autoencoder may be represented as linear combinations of opcode n-grams.

In one example, the systems described herein may extract opcodes from disassembled binaries and then collect opcode n-grams for each sample in the dataset and train an autoencoder using the samples. These systems may train the autoencoder for a fixed number of epochs and the autoencoder may learn features that are represented as linear combinations of opcode n-grams. The systems described herein may then use the resulting features to initialize a neural network classifier. These systems may then further train the neural network classifier via supervised backpropagation with labeled training data. Additionally or alternatively, in some examples security researches may inspect the resulting features and further refine the features by manual analysis to assist with the process of high-level feature development to be deployed in static detection approaches. In some examples, the systems described herein may unpack program binaries before extracting the opcodes.

Figure 6:
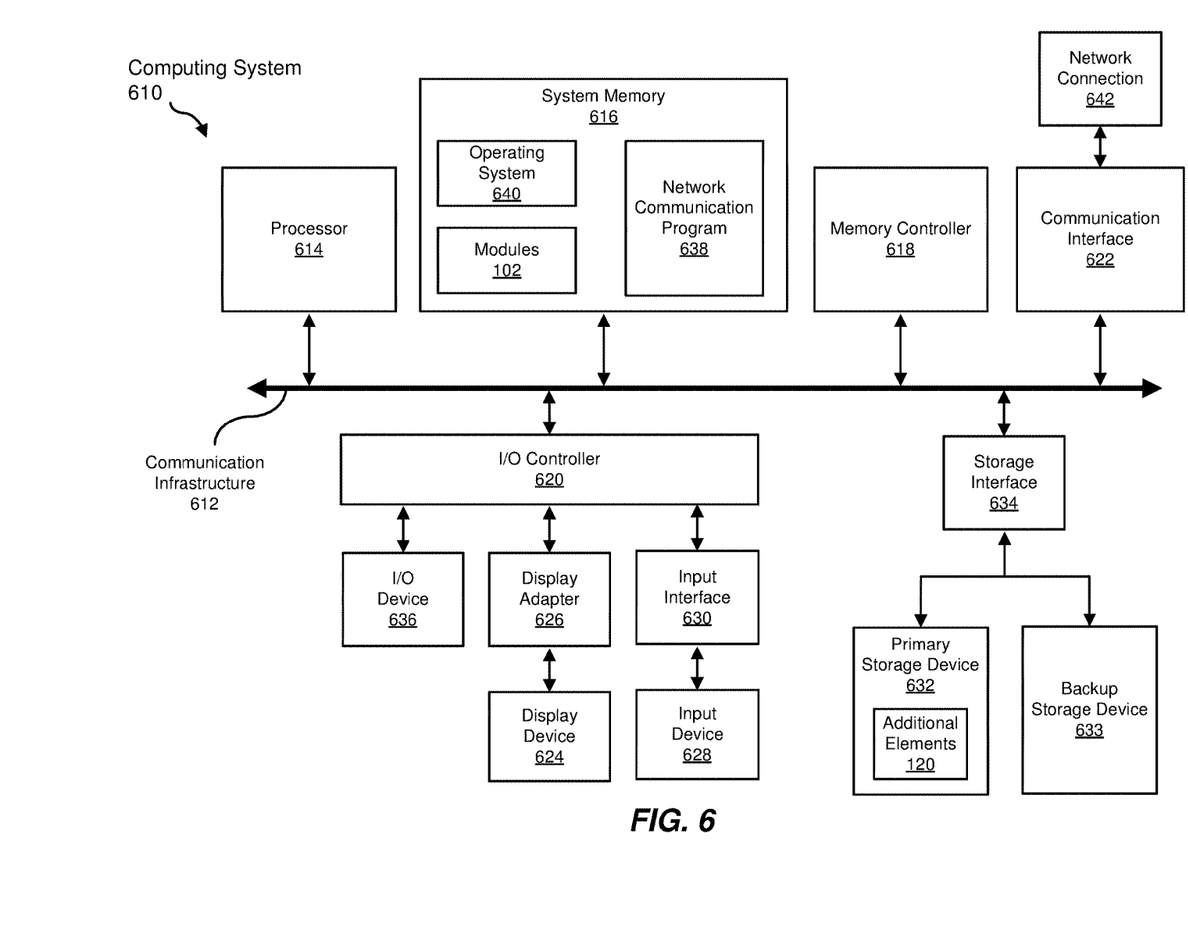
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, additional elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
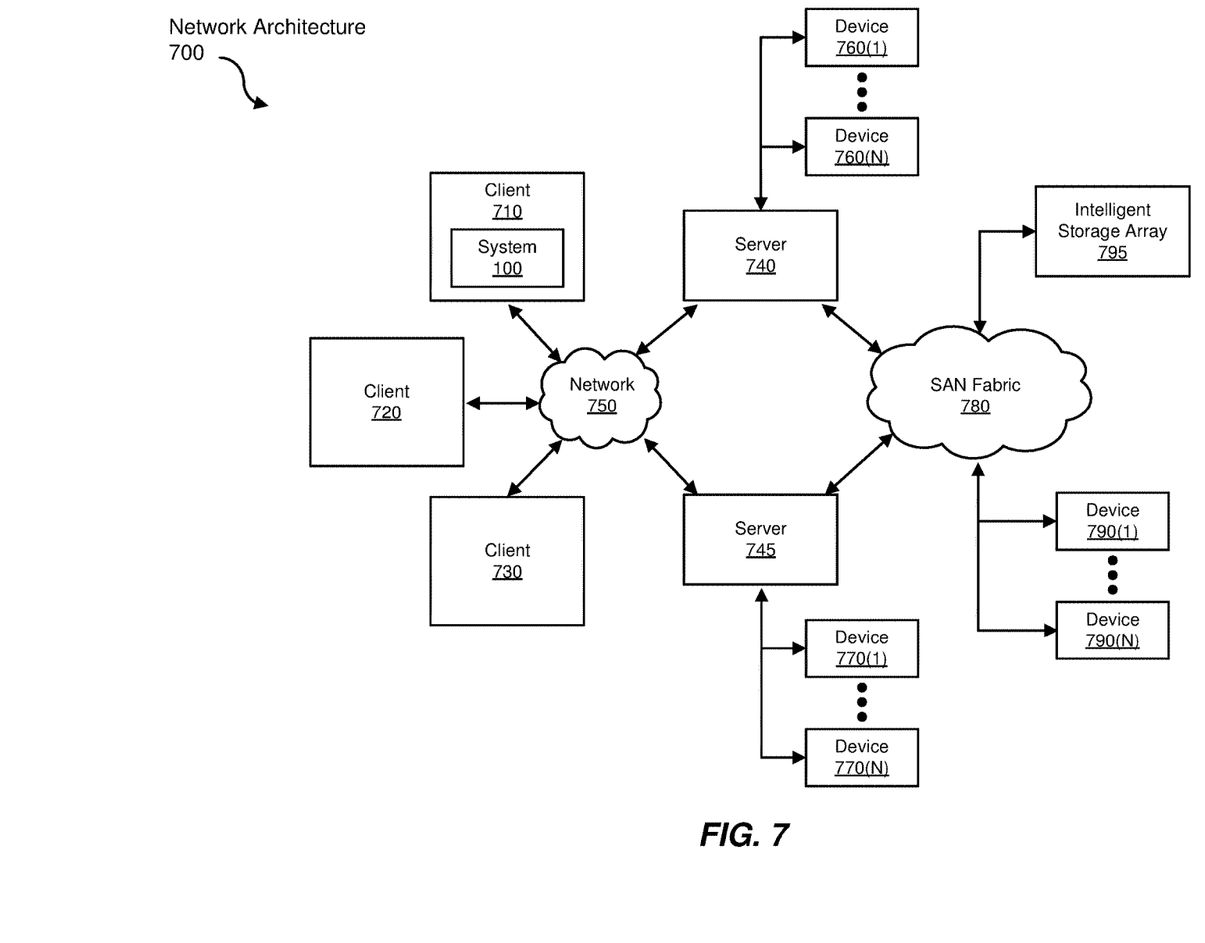
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the instant disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for detecting malware.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive programs to be transformed, transform the programs to opcode n-grams, output a result of the transformation to an autoencoder, use the result of the transformation to extract features from the autoencoder, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting malware, at least a portion of the method being performed by a computing device comprising at least one processor, the method comprising:
   identifying a plurality of programs represented in machine code;
   deriving a plurality of opcode n-grams from opcode sequences within the plurality of programs, each opcode n-gram within the plurality of opcode n-grams representing a sequence of opcodes extracted from a program within the plurality of programs;
   training an autoencoder by using the plurality of opcode n-grams as input;
   discovering a set of features within the autoencoder after training the autoencoder, each feature within the set of features comprising a linear combination of opcode n-grams from the plurality of opcode n-grams; and
   classifying a potentially malicious program as malicious by using the set of features discovered within the autoencoder to analyze the potentially malicious program by:
      initializing a neural network with the set of features discovered within the autoencoder;
      training the neural network with supervision using a training set labeled to indicate whether each sample within the training set is malicious; and
      classifying the potentially malicious program using the trained neural network.

2. The computer-implemented method of claim 1, further comprising performing a security action on the potentially malicious program based on classifying the potentially malicious program as malicious.

3. The computer-implemented method of claim 1, wherein using the set of features discovered within the autoencoder to analyze the potentially malicious program comprises:
   extracting the set of features discovered within the autoencoder from the potentially malicious program; and
   providing the extracted set of features as input to a machine learning classifier previously trained according to the set of features discovered within the autoencoder.

4. The computer-implemented method of claim 1, wherein the plurality of opcode n-grams comprises machine code opcodes and not mnemonic-based instructions.

5. The computer-implemented method of claim 1, wherein the plurality of opcode n-grams comprises opcodes without accompanying operands.

6. The computer-implemented method of claim 1, deriving the plurality of opcode n-grams from the plurality of programs comprises excluding a subset of opcodes from the plurality of opcode n-grams.

7. The computer-implemented method of claim 1, wherein deriving the plurality of opcode n-grams from the plurality of programs comprises extracting a plurality of opcodes from a program within the plurality of programs without mapping the opcode to a mnemonic instruction.

8. A system for detecting malware, the system comprising:
   an identification module, stored in memory, that identifies a plurality of programs represented in machine code;
   a derivation module, stored in memory, that derives a plurality of opcode n-grams from opcode sequences within the plurality of programs, each opcode n-gram within the plurality of opcode n-grams representing a sequence of opcodes extracted from a program within the plurality of programs;
   a training module, stored in memory, that trains an autoencoder by using the plurality of opcode n-grams as input;
   a discovery module, stored in memory, that discovers a set of features within the autoencoder after training the autoencoder, each feature within the set of features comprising a linear combination of opcode n-grams from the plurality of opcode n-grams;
   a classification module, stored in memory, that classifies a potentially malicious program as malicious by using the set of features discovered within the autoencoder to analyze the potentially malicious program by:

initializing a neural network with the set of features discovered within the autoencoder;
training the neural network with supervision using a training set labeled to indicate whether each sample within the training set is malicious; and
classifying the potentially malicious program using the trained neural network; and
at least one physical processor configured to execute the identification module, the derivation module, the training module, the discovery module, and the classification module.

9. The system of claim 8, wherein the classification module further performs a security action on the potentially malicious program based on classifying the potentially malicious program as malicious.

10. The system of claim 8, wherein the classification module uses the set of features discovered within the autoencoder to analyze the potentially malicious program by:
extracting the set of features discovered within the autoencoder from the potentially malicious program;
providing the extracted set of features as input to a machine learning classifier previously trained according to the set of features discovered within the autoencoder.

11. The system of claim 8, wherein the plurality of opcode n-grams comprises machine code opcodes and not mnemonic-based instructions.

12. The system of claim 8, wherein the plurality of opcode n-grams comprises opcodes without accompanying operands.

13. The system of claim 8, wherein the derivation module derives the plurality of opcode n-grams from the plurality of programs by excluding a subset of opcodes from the plurality of opcode n-grams.

14. The system of claim 8, wherein the derivation module derives the plurality of opcode n-grams from the plurality of programs by extracting a plurality of opcodes from a program within the plurality of programs without mapping the opcode to a mnemonic instruction.

15. A non-transitory computer-readable medium comprising one or more computer-readable instructions that, when executed by at least one processor of a computing device, cause the computing device to:
identify a plurality of programs represented in machine code;
derive a plurality of opcode n-grams from opcode sequences within the plurality of programs, each opcode n-gram within the plurality of opcode n-grams representing a sequence of opcodes extracted from a program within the plurality of programs;
train an autoencoder by using the plurality of opcode n-grams as input;
discover a set of features within the autoencoder after training the autoencoder, each feature within the set of features comprising a linear combination of opcode n-grams from the plurality of opcode n-grams; and
classify a potentially malicious program as malicious by using the set of features discovered within the autoencoder to analyze the potentially malicious program by:
initializing a neural network with the set of features discovered within the autoencoder;
training the neural network with supervision using a training set labeled to indicate whether each sample within the training set is malicious; and
classifying the potentially malicious program using the trained neural network.

16. The non-transitory computer-readable medium of claim 15, wherein the one or more computer-readable instructions further cause the computing device to perform a security action on the potentially malicious program based on classifying the potentially malicious program as malicious.

17. The non-transitory computer-readable medium of claim 15, wherein the one or more computer-readable instructions cause the computing device to use the set of features discovered within the autoencoder to analyze the potentially malicious program by causing the computing device to:
extract the set of features discovered within the autoencoder from the potentially malicious program; and
provide the extracted set of features as input to a machine learning classifier previously trained according to the set of features discovered within the autoencoder.

\* \* \* \* \*